United States Patent
Lin

(10) Patent No.: US 8,108,002 B2
(45) Date of Patent: *Jan. 31, 2012

(54) COMMUNICATION APPARATUSES EQUIPPED WITH MORE THAN ONE SUBSCRIBER IDENTITY CARD AND CAPABLE OF PROVIDING RELIABLE COMMUNICATION QUALITY

(75) Inventor: Keng-Chung Lin, Kaohsiung (TW)

(73) Assignee: Mediatek Inc., Hsin-Chu (TW)

( * ) Notice: Subject to any disclaimer, the term of this patent is extended or adjusted under 35 U.S.C. 154(b) by 548 days.

This patent is subject to a terminal disclaimer.

(21) Appl. No.: 12/275,399

(22) Filed: Nov. 21, 2008

(65) Prior Publication Data

US 2009/0239582 A1    Sep. 24, 2009

Related U.S. Application Data

(60) Provisional application No. 61/038,426, filed on Mar. 21, 2008.

(51) Int. Cl.
 *H04B 1/38* (2006.01)
(52) U.S. Cl. .......................... 455/558; 370/261; 370/328
(58) Field of Classification Search .................. 455/558, 455/550.1, 552.1, 436, 416, 553.1, 417, 411, 455/422.1, 458, 435.1; 370/261, 328
See application file for complete search history.

(56) References Cited

U.S. PATENT DOCUMENTS

| | | | |
|---|---|---|---|
| 6,516,190 B1 | 2/2003 | Linkola | |
| 6,543,686 B1 | 4/2003 | Ritter | |
| 7,171,226 B2 | 1/2007 | Crocker et al. | |
| 7,174,174 B2 | 2/2007 | Boris et al. | |
| 2003/0125073 A1 | 7/2003 | Tsai et al. | |
| 2003/0129971 A1 | 7/2003 | Gopikanth | |
| 2004/0006512 A1 | 1/2004 | Rebsamen | |
| 2004/0023687 A1 | 2/2004 | Diomelli | |
| 2007/0184858 A1 | 8/2007 | Landschaft et al. | |
| 2008/0020773 A1 | 1/2008 | Black et al. | |
| 2008/0064443 A1 | 3/2008 | Shin | |
| 2009/0005085 A1 | 1/2009 | Das | |
| 2009/0291710 A1 * | 11/2009 | Jheng et al. | 455/558 |
| 2010/0255880 A1 * | 10/2010 | Huang et al. | 455/558 |

FOREIGN PATENT DOCUMENTS

CN    1383340    12/2002

(Continued)

OTHER PUBLICATIONS

3GPP TS 24.082 V7.1.0 (Sep. 2007) 3rd Generation Partnership Project; Technical Specification Group Core Network; Call Forwarding (CF) supplementary services; Stage 3 (Release 7).

(Continued)

*Primary Examiner* — Lam T Mai
(74) *Attorney, Agent, or Firm* — Thomas|Kayden

(57) ABSTRACT

A communication apparatus is provided. The communication apparatus includes at least one radio transceiver module, a first subscriber identity card, a second subscriber identity card and a processor. The first subscriber identity card camps on a first cell belonging to a first wireless network via the same or different radio transceiver modules. The second subscriber identity card camps on a second cell belonging to a second wireless network via the same or different radio transceiver modules. The processor, coupled to the first subscriber identity card, the second subscriber identity card and the radio transceiver module(s), receives an apparatus originated communication request with a destination address, compares a signal strength of a first signal received from the first cell with a signal strength of a second signal received from the second cell and establishes a wireless communication with a peer device having the destination address through the cell with better signal strength.

38 Claims, 13 Drawing Sheets

FOREIGN PATENT DOCUMENTS

| | | |
|---|---|---|
| CN | 1777306 | 5/2006 |
| CN | 1812610 | 8/2006 |
| CN | 1960550 A | 5/2007 |
| CN | 101056434 | 10/2007 |
| CN | 101094476 | 12/2007 |
| CN | 101094500 | 12/2007 |
| CN | 101098547 | 1/2008 |
| CN | 101141732 A | 3/2008 |
| EP | 1718087 | 11/2006 |

OTHER PUBLICATIONS

3GPP TS 24.072 V7.0.0 (Jun. 2007) 3rd Generation Partnership Project; Technical Specification Group Core Network; Call Deflection (CD) Supplementary Service; Stage 3 (Release 7).

English abstract of CN101141732A; pub. Mar. 12, 2008.

English abstract of CN1960550A; pub. May 9, 2007.

English language translation of abstract of CN 1812610 (published Aug. 2, 2006).

English language translation of abstract of CN 101094500 (published Dec. 26, 2007).

English language translation of abstract of CN 101098547 (published Jan. 2, 2008).

English language translation of abstract of CN 1777306 (published May 24, 2006).

English language translation of abstract of CN 1383340 (published Dec. 4, 2002).

English language translation of abstract of CN 101056434 (published Oct. 17, 2007).

English language translation of abstract of CN 101094476 (published Dec. 26, 2007).

\* cited by examiner

COMMUNICATION APPARATUSES EQUIPPED WITH MORE THAN ONE SUBSCRIBER IDENTITY CARD AND CAPABLE OF PROVIDING RELIABLE COMMUNICATION QUALITY

CROSS REFERENCE TO RELATED APPLICATIONS

This application claims the benefit of U.S. Provisional Application No. 61/038,426 filed Mar. 21, 2008 and entitled "Systems and methods for handling mobile originated (MO)", the entire contents of which are hereby incorporated by reference.

BACKGROUND OF THE INVENTION

1. Field of the Invention

The invention relates to a communication apparatus, and more particularly to a communication apparatus equipped with more than one subscriber identity card and capable of providing reliable communication quality.

2. Description of the Related Art

The term "wireless", normally refers to an electrical or electronic operation, which is accomplished without the use of a "hard wired" connection. "Wireless communication", is the transfer of information over a distance without the use of electrical conductors or wires. The distances involved may be short (a few meters for television remote controls) or very long (thousands or even millions of kilometers for radio communications). The best known example of wireless communication is the cellular telephone. Cellular telephones use radio waves to enable an operator to make phone calls to another party, from many locations world-wide. They can be used anywhere, as long as there is a cellular telephone site to house equipment that can transmit and receive signals, which are processed to transfer both voice and data to and from the cellular telephones.

There are various well-developed and -defined cellular communication technologies. For example, the Global System for Mobile communications (GSM) communication system is a well-defined and commonly adopted communications system, which uses time division multiple access (TDMA) technology, which is a multiplex access scheme for digital radio, to send voice, data, and signalling data (such as a dialed telephone number) between mobile phones and cell sites. The CDMA2000 is a hybrid mobile communications 2.5G/3G (generation) technology standard that uses code division multiple access (CDMA) technology. The UMTS (Universal Mobile Telecommunications System) is a 3G mobile communications system, which provides an enhanced range of multimedia services over the 2G GSM communication system. The Wireless Fidelity (Wi-Fi) is a technology defined by the 802.11b engineering standard and can be used for home networks, mobile phones, video games, to provide a high-frequency wireless local area network.

With the advanced development of wireless communication technologies, it is now possible to provide multiple wireless communication services using different or the same communication technologies in one communication apparatus. Thus, communication apparatuses equipped with more than one subscriber identity card and capable of providing reliable communication quality are provided.

BRIEF SUMMARY OF THE INVENTION

Communication apparatuses are provided. An embodiment of a communication apparatus comprises at least one radio transceiver module, a first subscriber identity card, a second subscriber identity card and a processor. The first subscriber identity card camps on a first cell belonging to a first wireless network via the same or different radio transceiver modules. The second subscriber identity card camps on a second cell belonging to a second wireless network via the same or different radio transceiver modules. The processor, coupled to the first subscriber identity card, the second subscriber identity card and the radio transceiver module(s), receives an apparatus originated communication request with a destination address, compares a signal strength of a first signal received from the first cell with a signal strength of a second signal received from the second cell and establishes a wireless communication with a peer device having the destination address through the cell with better signal strength.

Another embodiment of a communication apparatus comprises at least one radio transceiver module, a first subscriber identity card, a second subscriber identity card and a processor. The first subscriber identity card is with a first address camping on a first cell belonging to a first wireless network via the same or different radio transceiver modules. The second subscriber identity card is with a second address camping on a second cell belonging to a second wireless network via the radio transceiver module. The processor, coupled to the first subscriber identity card, the second subscriber identity card and the radio transceiver module(s), receives a apparatus terminated communication request of the first subscriber identity card with an origination address from the first cell, compares a signal strength of a first signal received from the first cell with a signal strength of a second signal received from the second cell and transmits a redirection request through the first cell to the first wireless network via the radio transceiver module to instruct the first wireless network to redirect the apparatus terminated communication request to the second subscriber identity card when the signal strength of the second signal is better than the signal strength of the first signal.

Another embodiment of a communication apparatus comprises a single radio transceiver module, a first subscriber identity card, a second subscriber identity card and a processor. The first subscriber identity card camps on a first cell belonging to a first wireless network via the radio transceiver module. The second subscriber identity card camps on a second cell belonging to a second wireless network via the radio transceiver module. The processor is coupled to the first subscriber identity card, the second subscriber identity card and the radio transceiver module, transmits a message through the second cell to the second network via the radio transceiver module right after the first subscriber identity card has finished a wireless communication with a peer communication apparatus.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
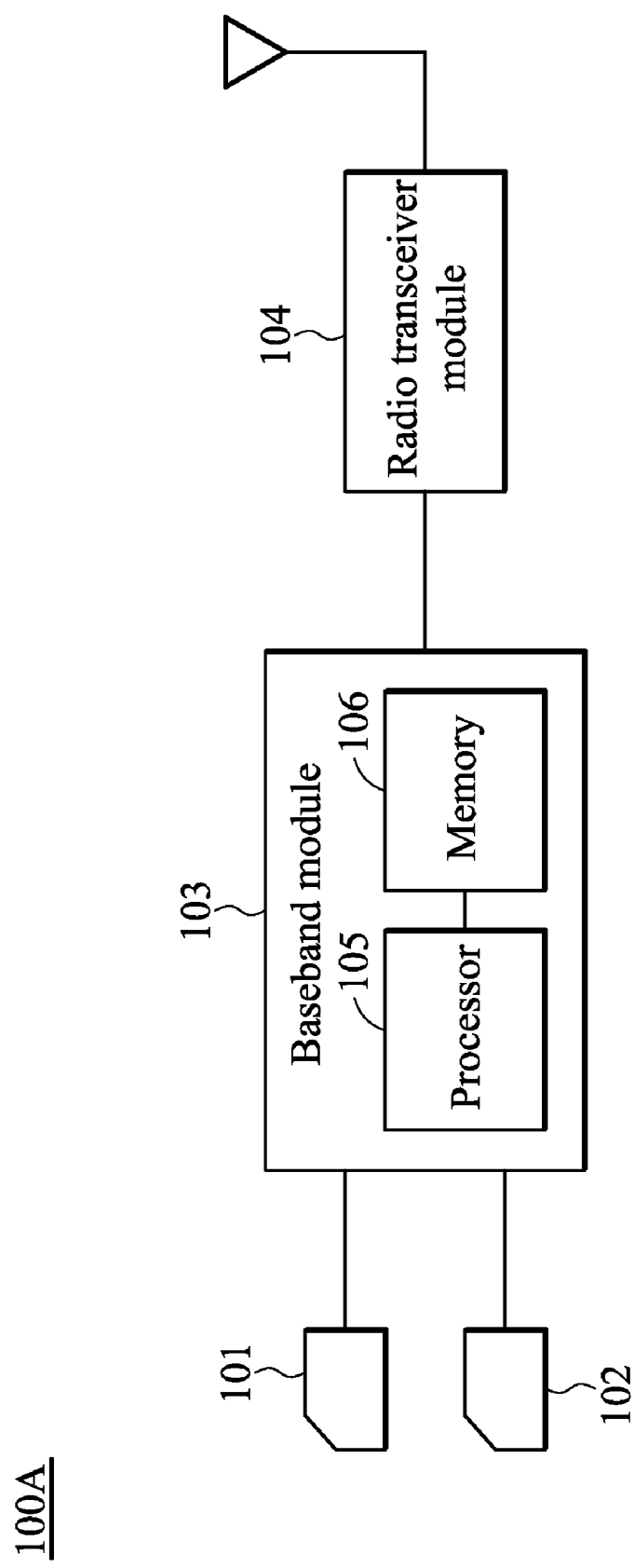
FIG. 1 shows a communication apparatus according to an embodiment of the invention.

FIG. 1 shows a communication apparatus capable of providing reliable communication service according to an embodiment of the invention. As shown in FIG. 1, communication apparatus 100A comprises subscriber identity cards 101 and 102, a baseband module 103, and a radio transceiver module 104, wherein the baseband module 103 is coupled to the subscriber identity cards 101 and 102, and the radio transceiver module 104. The radio transceiver module 104 receives wireless radio frequency signals, converts the received signals to baseband signals to be processed by the baseband module 103, or receives baseband signals from the baseband module 103 and converts the received signals to wireless radio frequency signals to be transmitted to a peer device. The radio transceiver module 104 may comprise a plurality of hardware devices to perform radio frequency conversion. For example, the radio transceiver module 104 may comprise a mixer to multiply the baseband signals with a carrier oscillated in the radio frequency of the wireless communication system, wherein the radio frequency may be, for example, 900 MHz or 1800 MHz for a global system for mobile communication (GSM) communication system, or 1900 MHz or 2100 MHz for a Universal Mobile Telecommunications System (UMTS) communication system. The baseband module 103 further converts the baseband signals to a plurality of digital signals, and processes the digital signals, and vice versa. The baseband module 103 may also comprise a plurality of hardware devices to perform baseband signal processing. The baseband signal processing may comprise analog to digital conversion (ADC)/digital to analog conversion (DAC), gain adjustments, modulation/demodulation, encoding/decoding, and so on. The baseband module 103 further comprises a memory device 106 and a processor 105 for controlling the operations of the baseband module 103, the radio transceiver module 104, and the subscriber identity cards 101 and 102 plugged into two sockets, respectively. The processor 105 reads data from the plugged subscriber identity cards 101 and 102 and writes data to the plugged subscriber identity cards 101 and 102. It is to be noted that the memory device 106 may also be configured outside of the baseband module 103 and the invention should not be limited thereto.

Figure 2:
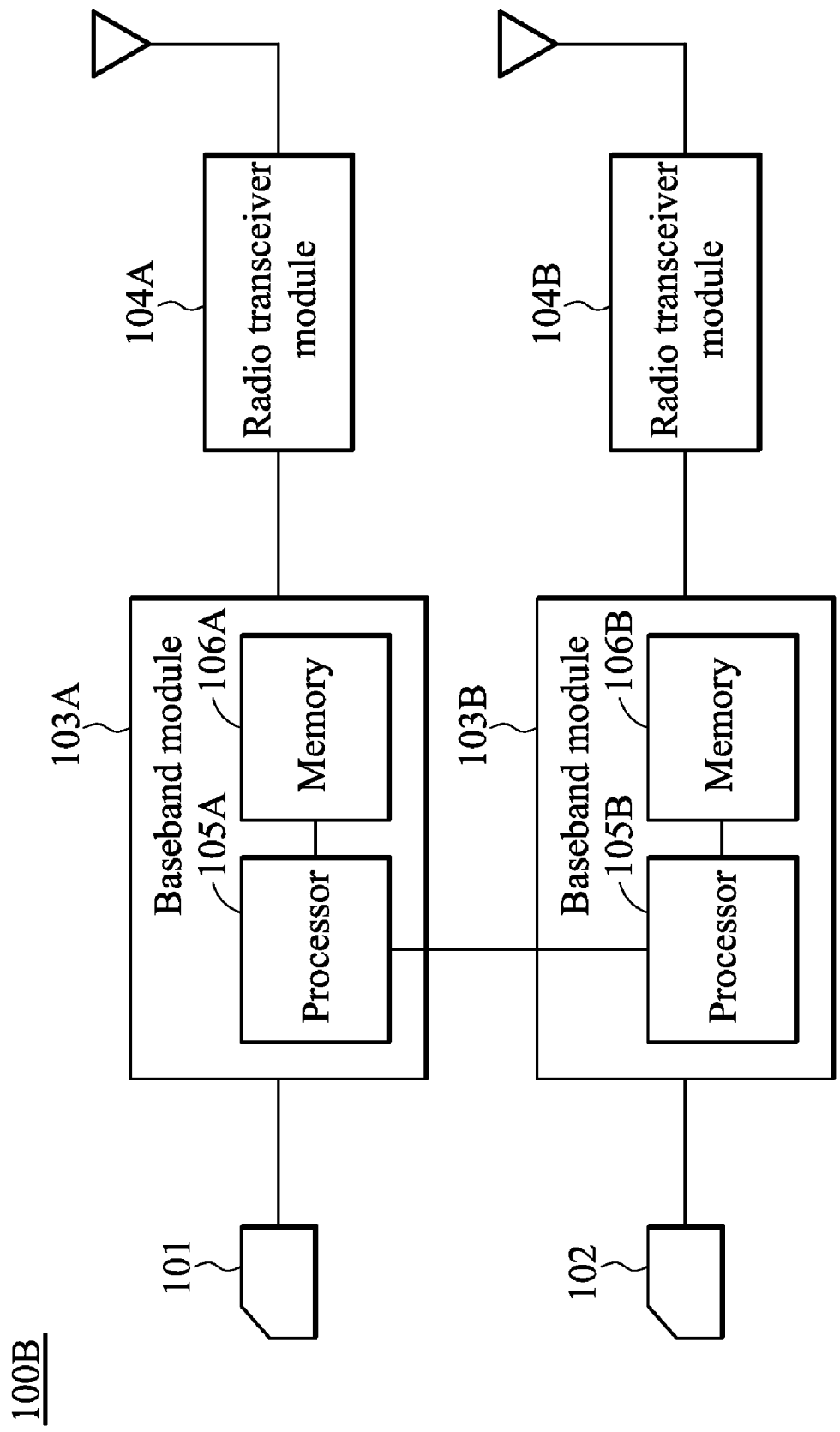
FIG. 2 shows a communication apparatus according to another embodiment of the invention.
Figure 3:
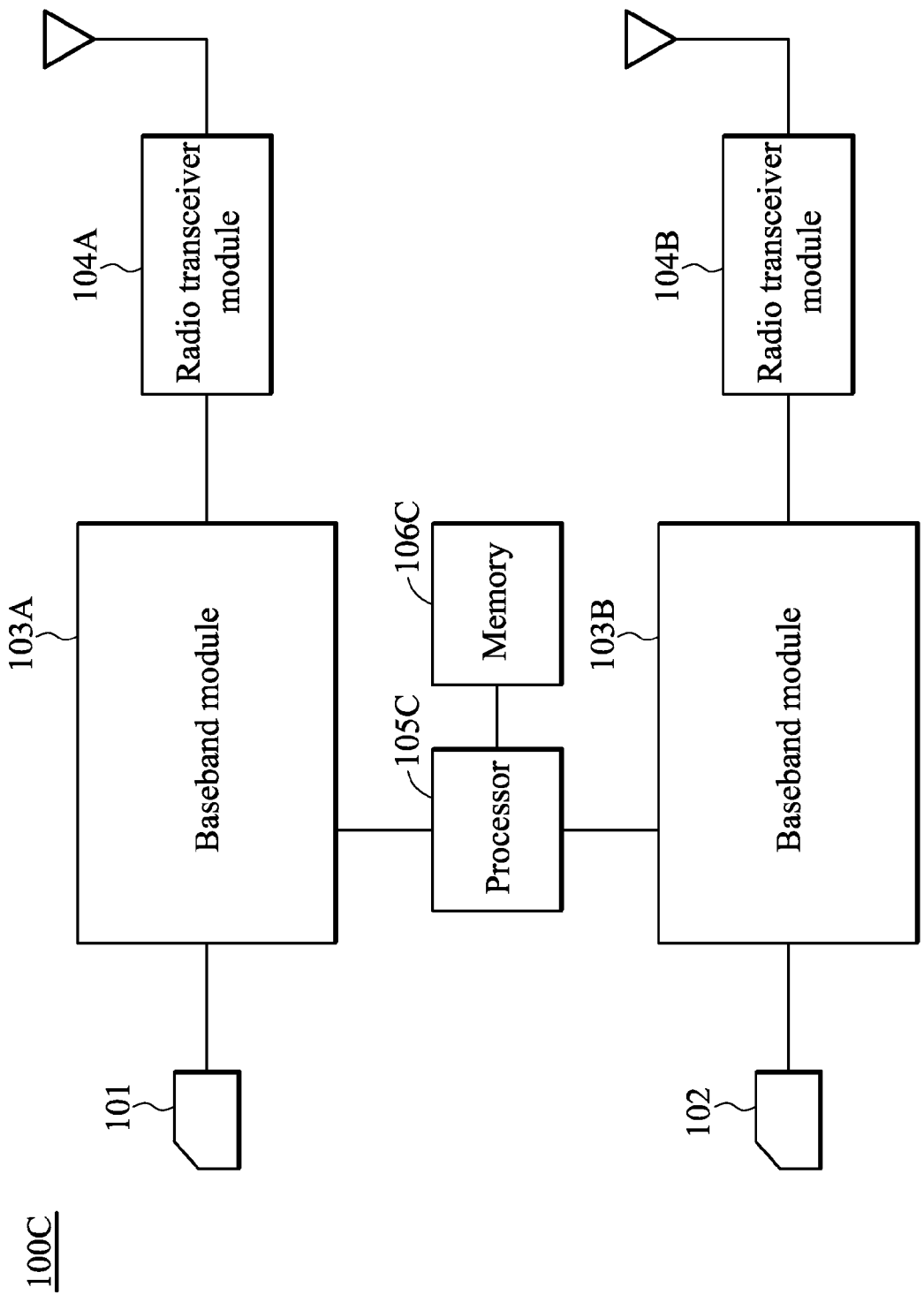
FIG. 3 shows a communication apparatus according to another embodiment of the invention.

According to another embodiment of the invention, the communication apparatus comprising more than one subscriber identity card, may also comprise more than one baseband module and radio transceiver module, respectively, for each subscriber identity card. FIG. 2 and FIG. 3 respectively show communication apparatuses according to another embodiments of the invention. As shown in FIG. 2 and FIG. 3, communication apparatus 100B comprises subscriber identity cards 101 and 102, baseband modules 103A and 103B, and radio transceiver modules 104A and 104B, wherein the baseband module 103A is coupled to the subscriber identity card 101 and the radio transceiver module 104A, and the baseband module 103B is respectively coupled to the subscriber identity card 102 and the radio transceiver module 104B. The operations of the baseband modules 103A and 103B are similar with that of the baseband module 103 and are not described here for brevity. Similarly, the operations of the radio transceiver module 104A and 104B are similar with that of the radio transceiver module 104 and are not described here for brevity. It is noted that in FIG. 2, the baseband module 103A comprises a memory device 106A and a processor 105A for controlling the operations of the subscriber identity card 101, the baseband module 103A and the radio transceiver module 104A, and the baseband module 103B also comprises a memory device 106B and a processor 105B for controlling the operations of the subscriber identity card 102, the baseband module 103B and the radio transceiver module 104B. The processors 105A and 105B may be coupled and communicate with each other. The data stored in memory devices 106A and 106B may be shared and accessed by both of the processors 105A and 105B. For example, one of the processor may be a master processor and the other one may be a slave processor to cooperate with the master processor. As shown in FIG. 3, according to a still another embodiment of the invention, the communication apparatus 100C may comprise one memory device 106C and one processor 105C for controlling the operations of the subscriber identity cards 101 and 102, the baseband modules 103A and 103B, and the radio transceiver modules 104A and 104B. The operations of the processor 105C are similar with that of the processor 105 and are not described here for brevity. The described baseband processors 105, 105A, 105B and 105C may be general-purpose processors and execute program code performing the mentioned control operations. The described memory 106, 106A, 106B and 106C may comprise at least one of read only memory (ROM), random access memory (RAM), NOR flash and NAND flash for storing program code and data.

Figure 4:
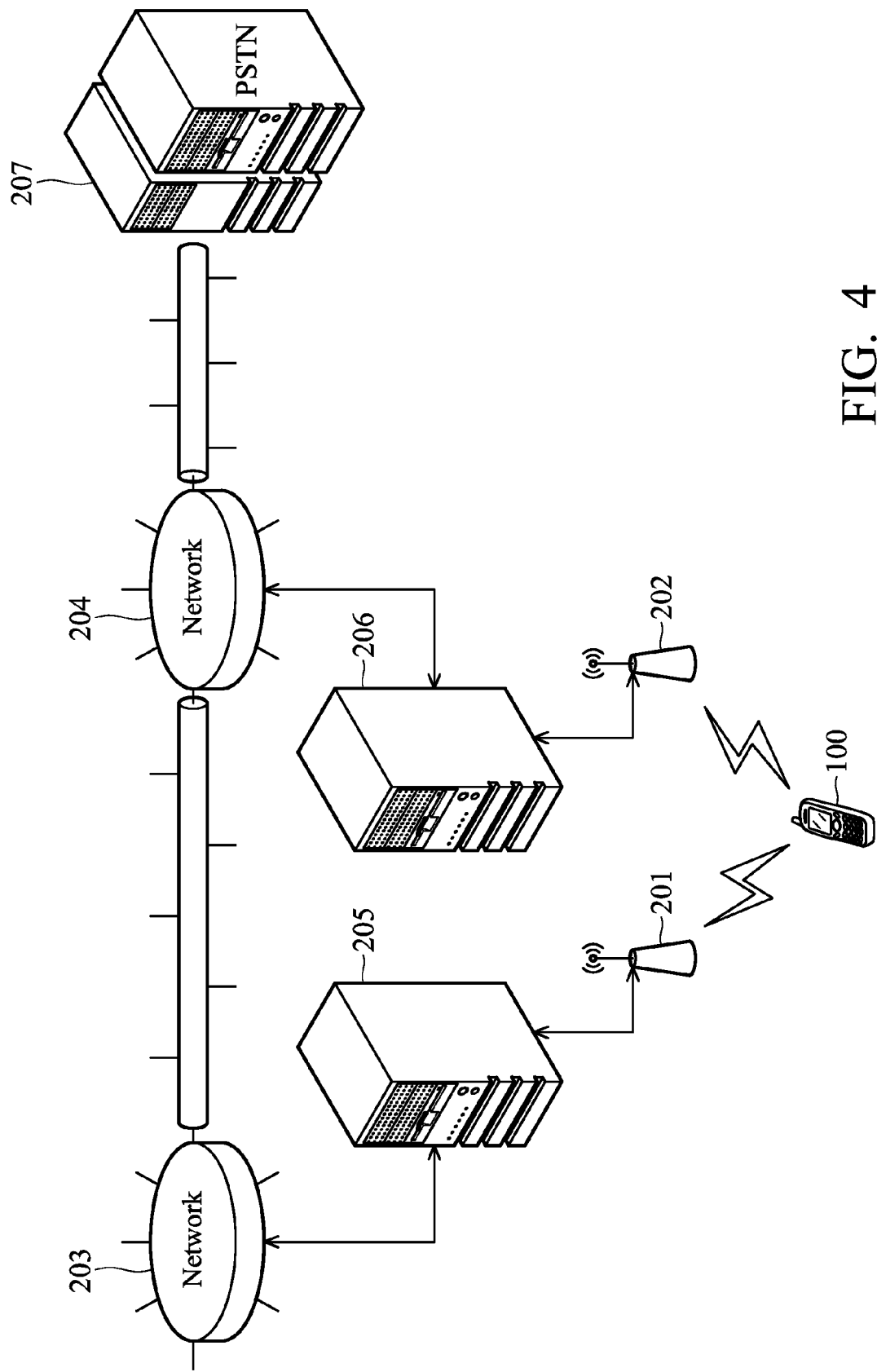
FIG. 4 shows an exemplary network topology according to an embodiment of the invention.

FIG. 4 shows an exemplary network topology according to an embodiment of the invention. The communication apparatus 100 shown in FIG. 4, may be one of the communication apparatuses 100A, 100B and 100C previously described in FIG. 1 to FIG. 3. Thus, from hereinafter, the communication apparatus 100 will be used to represent all like previously described apparatus for brevity. The communication apparatus 100, equipped with more than one subscriber identity card, may simultaneously access more than one of networks 203 and 204 of the same or different communication technologies, where the network 203 or 204 may be the GSM, WCDMA, Wi-Fi, CDMA2000 or Time Division-Synchronous Code Division Multiple Access (TD-SCDMA) network, or Internet, or the like, after camping on or associating with the cells managed by access stations 201 and 202, where the access station 201 or 202 may be a base station, a node-B, an access point compatible with 802.11a, 802.11b, 802.11g or 802.16. The communication apparatus 100 may issue an apparatus originated communication request, also referred to as mobile originated (MO) call request, such as a voice call, a data call, a video call, or a voice over Internet Protocol (VOIP) call, to a called party (i.e. the corresponding wired or wireless peer communication apparatus) through at least one of the networks 203 and 204 with corresponding intermediary apparatuses 205 and 206 (for example, the GSM network with a Base Station Controller (BSC), the WCDMA/TD-SCDMA network with a Radio Network Controller (RNC), or the Internet with a Session Initiation Protocol (SIP) server), or through the Public Switched Telephone Network (PSTN) 207 or any combinations thereof, by using any of the equipped subscriber identity cards. Moreover, the communication apparatus 100 may receive an apparatus terminated communication request, also referred to as a mobile terminated (MT) call request, such as an incoming phone call, with any of the subscriber identity cards from a calling party (i.e. an origination wired or wireless peer communication apparatus with an origination address), where the origination address may be a telephone number, a cellular phone number, an Internet Protocol (IP) address, or the like. The apparatus terminated communication request is a communication request initiated from the origination peer communication apparatus to request to establish wireless communication with the communication apparatus 100. It is to be understood that there may be one or more gateways positioned between heterogeneous types of networks.

According to an embodiment of the invention, any of the subscriber identity cards 101 and 102 may relate to one type of wireless communication system. For example, the subscriber identity card 101 or 102 may be the subscriber identity module (SIM) card corresponding to the GSM communication system, or the universal subscriber identity module (USIM) card corresponding to the UMTS or TD-SCDMA communication system, or the removable user identity module (RUIM) card or the CDMA Subscriber Identity Module (CSIM) card corresponding to the CDMA2000 communication system, or others. An SIM card typically contains user account information, an international mobile subscriber identity (IMSI) and a set of SIM application toolkit (SAT) commands and provides storage space for phone book contacts. The processor, such as 105, 105A, 105B or 105C, of the baseband module, such as 103, 103A or 103B, may interact with a micro control unit (MCU) of the SIM card to fetch data or SAT commands from the plugged SIM card. The communication apparatus 100 is immediately programmed after being plugged into the SIM card. The SIM card may also be programmed to display custom menus for personalized services. The communication apparatus 100 may be plugged into an USIM card for UMTS or TD-SCDMA (also called 3G) telephony communication. The USIM card stores user account information, IMSI, authentication information and a set of USIM Application Toolkit (USAT) commands and provides storage space for text messages and phone book contacts. The baseband processor 105, 105A, 105B or 105C may interact with an MCU of the USIM card to fetch data or SAT commands from the plugged USIM card. The phone book on the USIM card is more enhanced than that on the SIM card. For authentication purposes, the USIM card may store a long-term preshared secret key K, which is shared with the Authentication Center (AuC) in the network. The USIM MCU may verify a sequence number that may be within a range, by using a window mechanism to avoid replay attacks, and generate the session keys CK and IK to be used in the confidentiality and integrity algorithms of the KASUMI (also termed A5/3) block cipher in the UMTS. The communication apparatus 100 is immediately programmed after being plugged into the USIM card. The IMSI is a unique number associated with a global system for mobile communication (GSM) or a universal mobile telecommunications system (UMTS) network user. The IMSI may be sent by the communication apparatus 100 to the GSM, UMTS or TD-SCDMA network to acquire other details of the mobile user in the Home Location Register (HLR) or, as locally copied, in the Visitor Location Register (VLR). An IMSI is typically 15 digits long, but can be shorter. The first 3 digits are the Mobile Country Code (MCC), and the following digits, are the Mobile Network Code (MNC), which are either 2 digits (European standard) or 3 digits (North American standard). The remaining digits are the mobile subscriber identification number (MSIN) for the GSM or UMTS network user.

Figure 5:
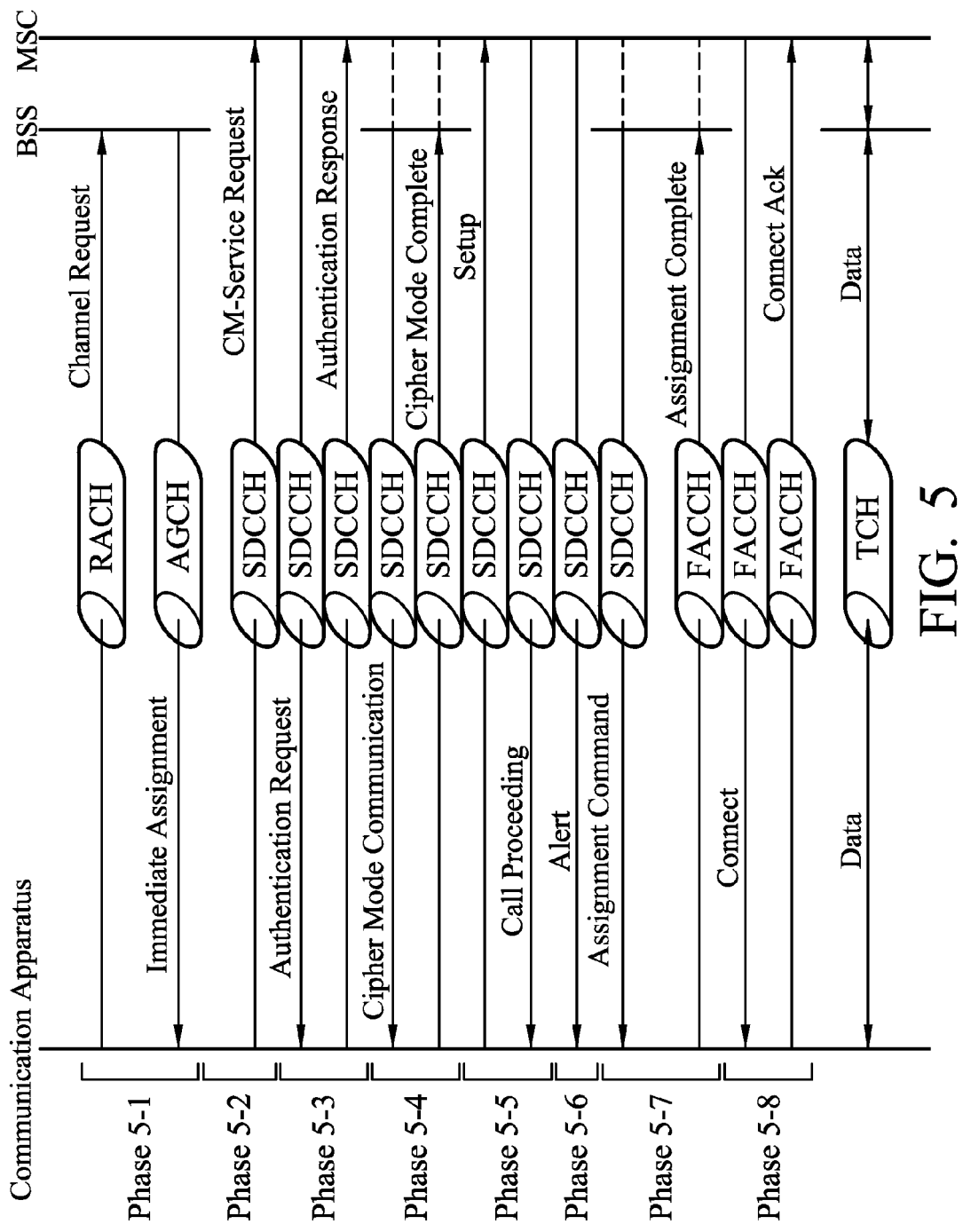
FIG. 5 shows logical channel assignments and signaling procedures of an apparatus originated request in a GSM communication system.

FIG. 5 shows logical channel assignments and signaling procedures of an apparatus originated communication request, may also referred to as a mobile originated (MO) request, in a GSM communication system. In a GSM communication system, a Call Control (CC), comprises procedures to establish, control, and terminate a communication service, and is an element of Connection Management (CM). When the communication apparatus 100 is planning to originate a communication service, such as a voice call service, the CC entity first requests a Mobility Management (MM) connection from the local MM entity (Phase 1) via a Random Access Channel (RACH). For a standard call, the communication apparatus 100 may need to register with the wireless network, whereas for an emergency call, registration is only optionally required. That is, an emergency call may be established on an unenciphered Radio Resource (RR) connection from a communication apparatus 100 that has not registered with the wireless network. The base station system (BSS) in the wireless network may assign a Stand-alone Dedicated Control Channel (SDCCH) or a Traffic Channel (TCH) via an Immediate Assignment carried in the Access Grant Channel (AGCH). After the process of sending out a CM-service request (Phase 2), authentication (Phase 3) and ciphering (Phase 4) with the MSC via the SDDCH is completed, an MM connection is established. After successful establishment of the MM connection and activation of the user data encryption, the service-requesting CC entity is informed. Thus, the signals on the connection connect to the CC entity in the Mobile Switching Center MSC (SETUP). The MSC may respond to the connection request in several ways. The MSC may indicate with a message Call Proceeding (Phase 5-1) that the call request has been accepted and that all the necessary information for the setup of the call is available. Otherwise, the call request may be declined with a message Release Complete. Next, the communication apparatus 100 receives the Alert message (Phase 5-2) when the MSC is trying to connect to the called party. As soon as the called party receives the Alert message and accepts the call, the communication apparatus 100 receives an Assign Command and a dedicated channel will be assigned after the communication apparatus 100 responds to an Assignment Complete message via a Fast Associated Control Channel (FACCH) (Phase 5-3). The communication apparatus 100 next responds with a Connect Acknowledge message after receiving the Connect message from the MSC (Phase 5-4), and the traffic channel, successfully established on the TCH and the communication apparatus 100, may now begin to communicate with the called party. It is to be noted that the CC procedure of the WCDMA or TD-SCDMA communication system, also well-known in the art, is similar to that of GSM communication system and is not further described for brevity.

Figure 6A:
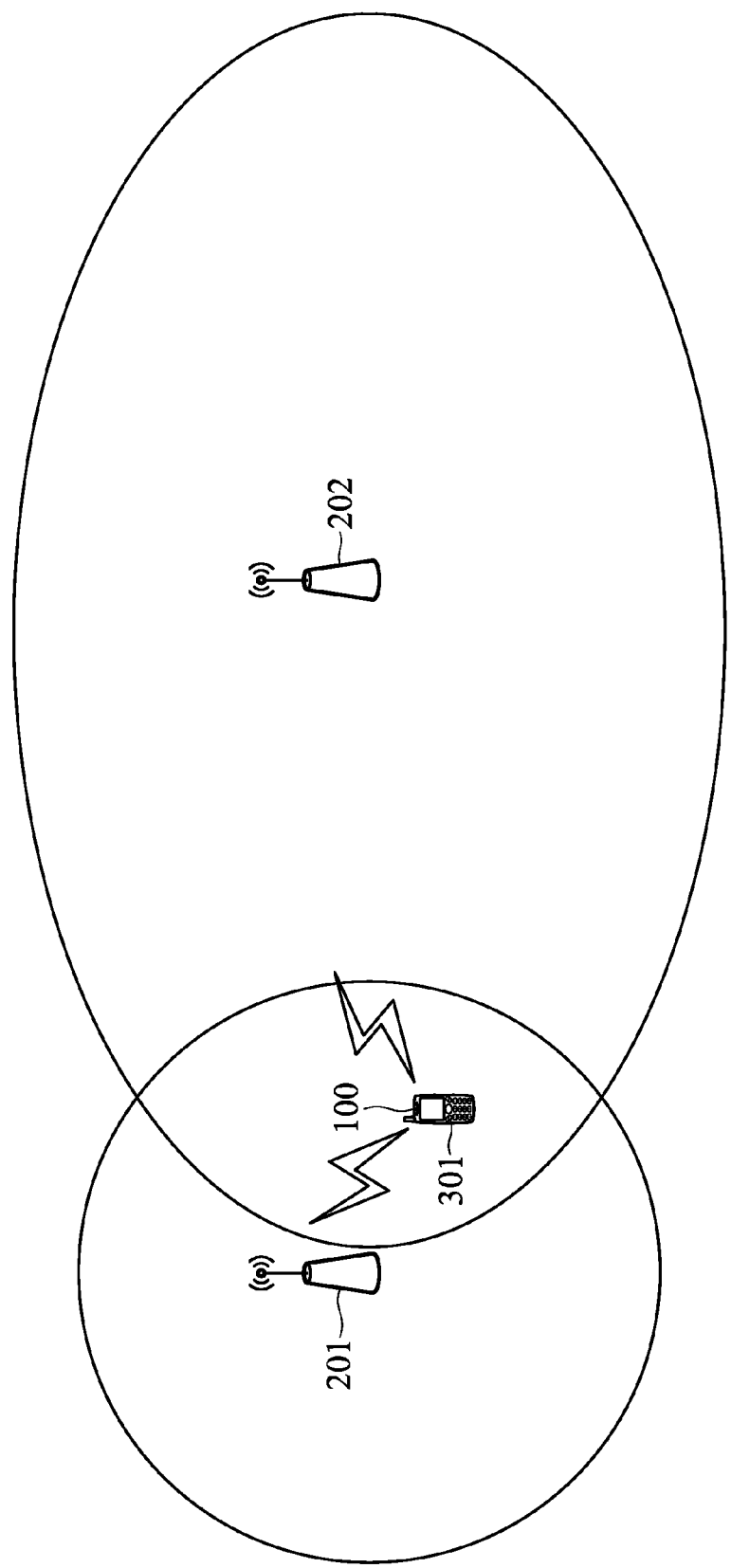
FIG. 6A shows exemplary coverage of two cells according to an embodiment of the invention.

According to a first embodiment of the invention, in order to reduce power consumption and achieve better communication quality, it is preferred for a communication apparatus 100 equipped with more than one subscriber identity card to issue an apparatus originated communication request to the cell with better signal quality. FIG. 6A shows exemplary coverage of two cells according to an embodiment of the invention. When the communication apparatus 100 is located in a place that is covered by two cells of the access stations 201 and 202 belonging to the corresponding wireless networks that the subscriber identity cards 101 and 102 respectively camps on, the communication apparatus 100 may distinguish the qualities of the cells by measuring the signal strength of the signals received from the cells, respectively. The received signals may be obtained from the broadcasted messages of the cells; as an example, the signals carried in the Broadcast Channel (BCCH) or the pilot signals carried in the broadcasted Common Pilot Channel (CPICH). In addition, the measurement may be, as an example, measuring the signal power or the signal to noise ratio (SNR) of the received signals, or others. When the communication apparatus 100 detects that the quality of one cell is better than the other, the communication apparatus 100 preferably transmits an apparatus originated communication request to the cell with the better signal quality. According to the embodiment of the invention, the signal qualities of the cells may be periodically updated and stored in a volatile/non-volatile storage device, such as the memory devices 106, 106A, 106B or 106C previously described.

Figure 7:
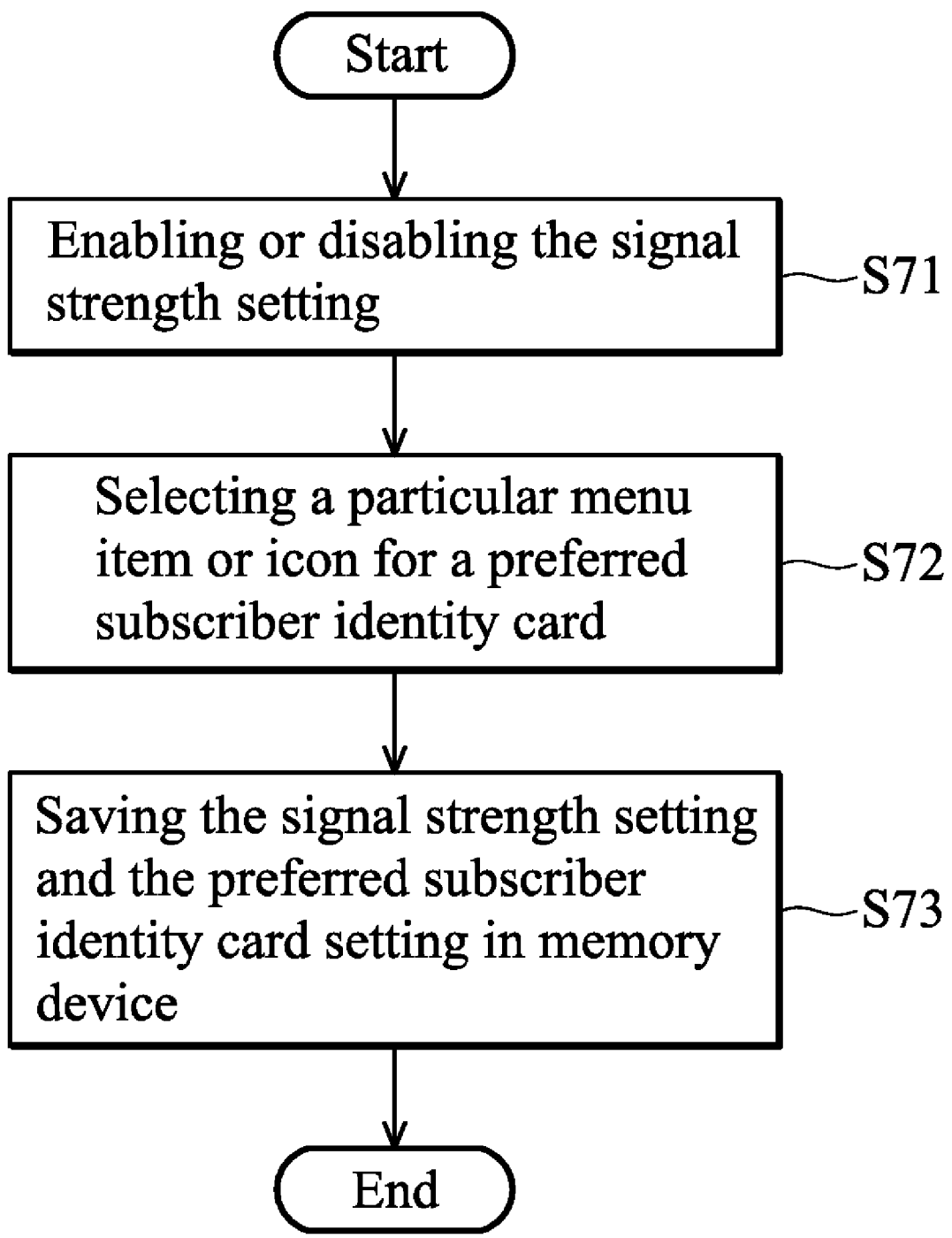
FIG. 7 shows a flow chart of a method to configure the signal strength setting according to the embodiment of the invention.

According to the embodiment of the invention, the memory device, such as 106, 106A, 106B or 106C, may also store a signal strength setting, and the processor, such as 105, 105A, 105B or 105C, may initiate the apparatus originated communication request to the cell with the better signal quality according to the signal strength setting. According to the embodiment of the invention, the memory device may further store information indicating one of subscriber identity cards 101 and 102 as a preferred subscriber identity card for the destination address, where the destination address may be a telephone number, a cellular phone number, an IP address, or the like, and the processor may use the selected preferred subscriber identity card to initiate the apparatus originated communication request when the signal qualities of the cells are detected as being substantially the same. FIG. 7 shows a flow chart of a method to configure the signal strength setting via a man-machine interface (MMI) according to the embodiment of the invention. The MMI may comprise screen menus and icons, command language and online help displayed on a display of the communication apparatus 100 with at least one input device of a touch panel, physical keys on a key pad, buttons, dragging jogs and the similar. By using input devices of the MMI, users may manually touch, press, click, rotate or move the input devices to operate the communication apparatus 100. Via the MMI, the user may enable or disable a signal strength setting so as to use the subscriber identity card that camps on the wireless network with better cell coverage (i.e. better signal strength) to transmit a communication request and to establish the communication service with a peer communication apparatus, or employ another criterion to determine a particular subscriber identity card to do so (Step S71). The user may also select a particular menu item or icon indicating a subscriber identity card to configure his/her preference so as to use the selected subscriber identity card when the signal qualities of the cells are detected as being substantially the same (Step S72). Finally, the signal strength setting and the preferred subscriber identity card setting are saved in the memory device (Step S73).

Figure 6B:
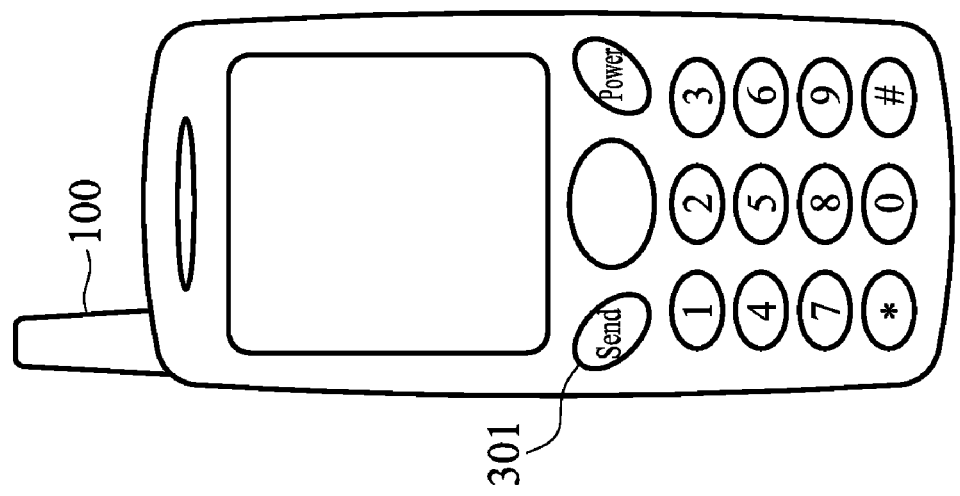
FIG. 6B shows a communication apparatus according to the embodiment of the invention.
Figure 8:
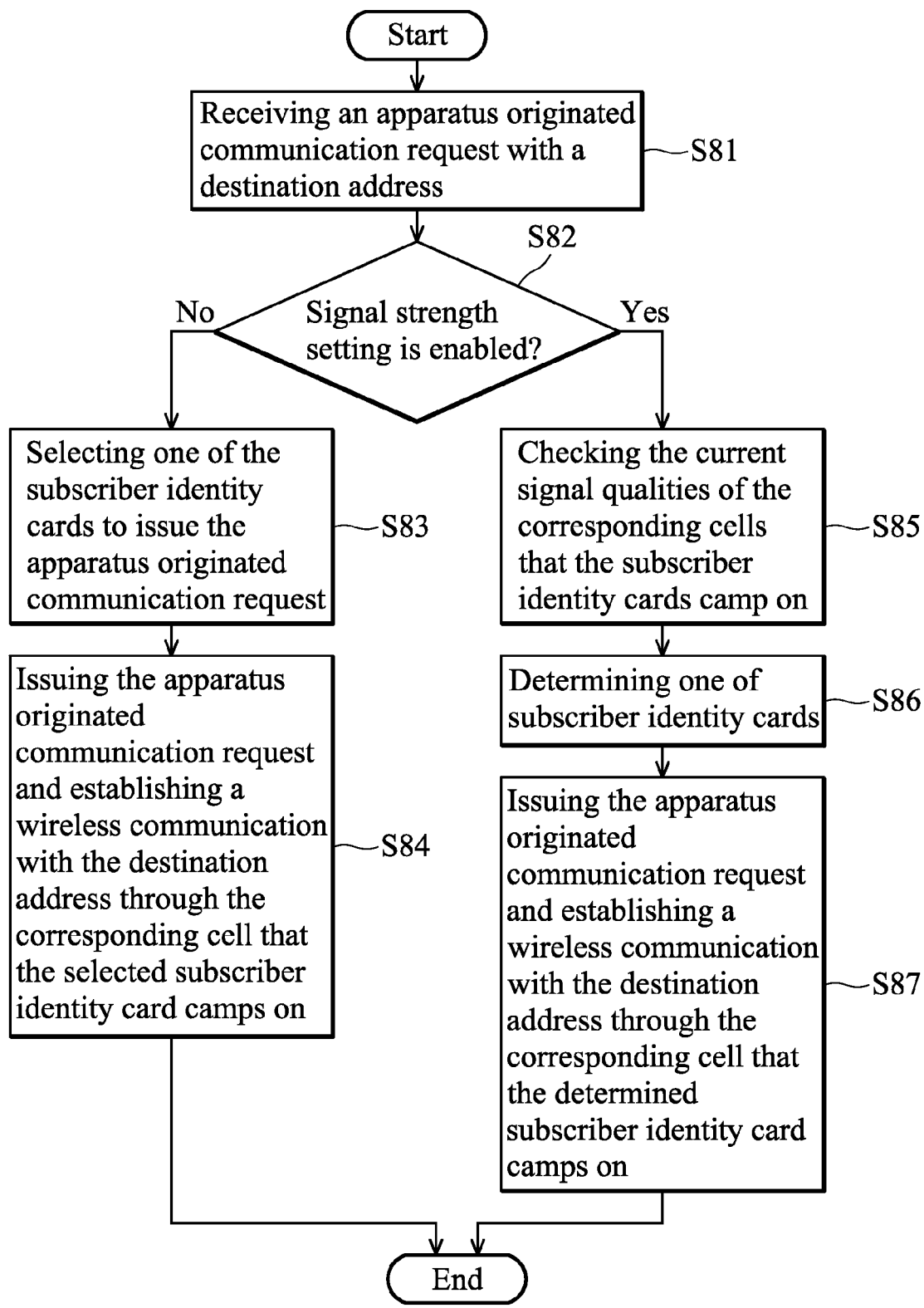
FIG. 8 shows a flow chart of the method for handling an apparatus originated communication request in a communication apparatus equipped with more than one subscriber identity card according to the embodiment of the invention.

FIG. 8 shows a flow chart of the method for handling an apparatus originated communication request in a communication apparatus equipped with more than one subscriber identity card according to the embodiment of the invention. When a user is planning to originate a communication service with another peer user, a contact name or a destination address of the peer user is selected from a contact menu by the user via an MMI, or a series of numbers indicating the destination address of the peer user is input by the user via an MMI. After the user presses a SEND key 301 as shown in FIG. 6B, the processor, such as 105, 105A, 105B or 105C, receives an apparatus originated communication request with the destination address (Step S81). Next, the processor determines whether the signal strength setting is enabled (Step S82). When the signal strength setting is disabled, the processor may activate the MMI to facilitate the user to select one of the subscriber identity cards (such as 101 and 102) to issue the apparatus originated communication request and receives an indication message for indicating the selection (Step S83). Next, the apparatus originated communication request is issued and a wireless communication with the destination address is established through the corresponding cell that the selected subscriber identity card camps on (Step S84). Alternatively, when the signal strength setting is enabled, the processor checks the current signal quality of the corresponding cells that the subscriber identity cards camp on (Step S85) by accessing the periodically updated signal qualities stored in the memory device, such as 106, 106A, 106B or 106C. Next, the processor compares the obtained signal qualities and determines one of subscriber identity cards with the better signal quality (Step S86). It is to be noted that the determined subscriber identity card may be the preferred subscriber identity card according to the preferred subscriber identity card setting when the signal qualities of the cells are detected as being substantially the same. Finally, the apparatus originated communication request is issued and a wireless communication with the destination address is established through the corresponding cell that the determined subscriber identity card camps on (Step S87).

Figure 9:
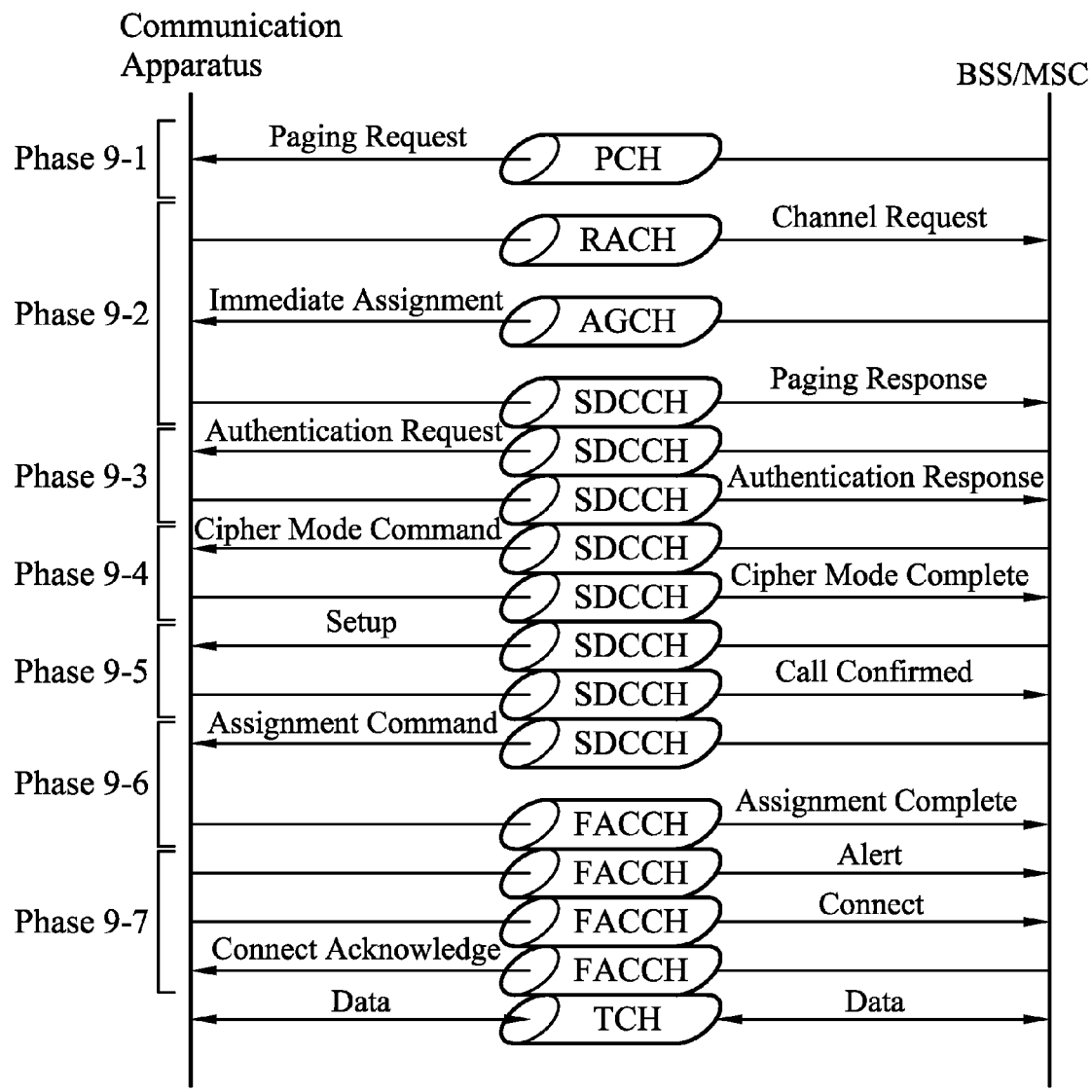
FIG. 9 shows logical channel assignments and signaling procedures of an apparatus terminated request in a GSM communication system.

FIG. 9 shows logical channel assignments and signaling procedures of an apparatus terminated communication request, may also referred to as a mobile terminated (MT) request, in a GSM communication system. When the communication apparatus 100 is being paged by a calling party, which means that the user of a peer wired or wireless communication apparatus is planning to originate a communication service with the communication apparatus 100, the CC entity first receives a Paging Request from the BSS/MSC via a Paging Channel (PCH) (Phase 9-1). The CC entity next requests an MM connection from the local MM entity via the RACH. The BSS in the wireless network may assign a SDCCH or a TCH via an Immediate Assignment carried in the AGCH, and the communication apparatus 100 responds with a Paging Response via the SDDCH to the BSS (Phase 9-2). After the process of authentication (Phase 9-3) and ciphering (Phase 9-4) with the MSC via the SDDCH is completed, an MM connection is established. After successful establishment of the MM connection and activation of the user data encryption, the CC entity is informed by a Setup message from MSC, and responds with a Call Confirmed message to the MSC (Phase 9-5). The communication apparatus 100 next receives an Assignment Command which indicates the allowance of assigning a dedicated channel (Phase 9-6), and the dedicated channel will be assigned after the communication apparatus 100 responds to an Assign Complete message, an Alert message, and a Connect message via a FACCH. As soon as the communication apparatus 100 receives the Connect Acknowledge message form the MSC (Phase 9-7), the dedicated channel is successfully established on the TCH and the communication apparatus 100, may begin to communicate with the calling party. It is to be noted that the CC procedure of the WCDMA or TD-SCDMA communication system, also well-known in the art, is similar to that of GSM communication system and is not further described for brevity.

According to a second embodiment of the invention, in order to reduce power consumption and achieve better communication quality, it is preferred for a communication apparatus 100 equipped with more than one subscriber identity card to redirect an apparatus terminated communication request that was originally directing to one of the subscriber identity cards (as an example, the subscriber identity card 101) to another subscriber identity card (as an example, the subscriber identity card 102) that camps on a cell with better signal quality. As shown in FIG. 6A, when the communication apparatus 100 is located in a place that is covered by two cells of the base stations 201 and 202 belonging to the corresponding wireless networks that the subscriber identity cards 101 and 102 respectively camp on, the communication apparatus 100 may distinguish the qualities of the cells as described above, and determine to answer an apparatus terminated communication request through the cell with better signal quality.

Figure 10:
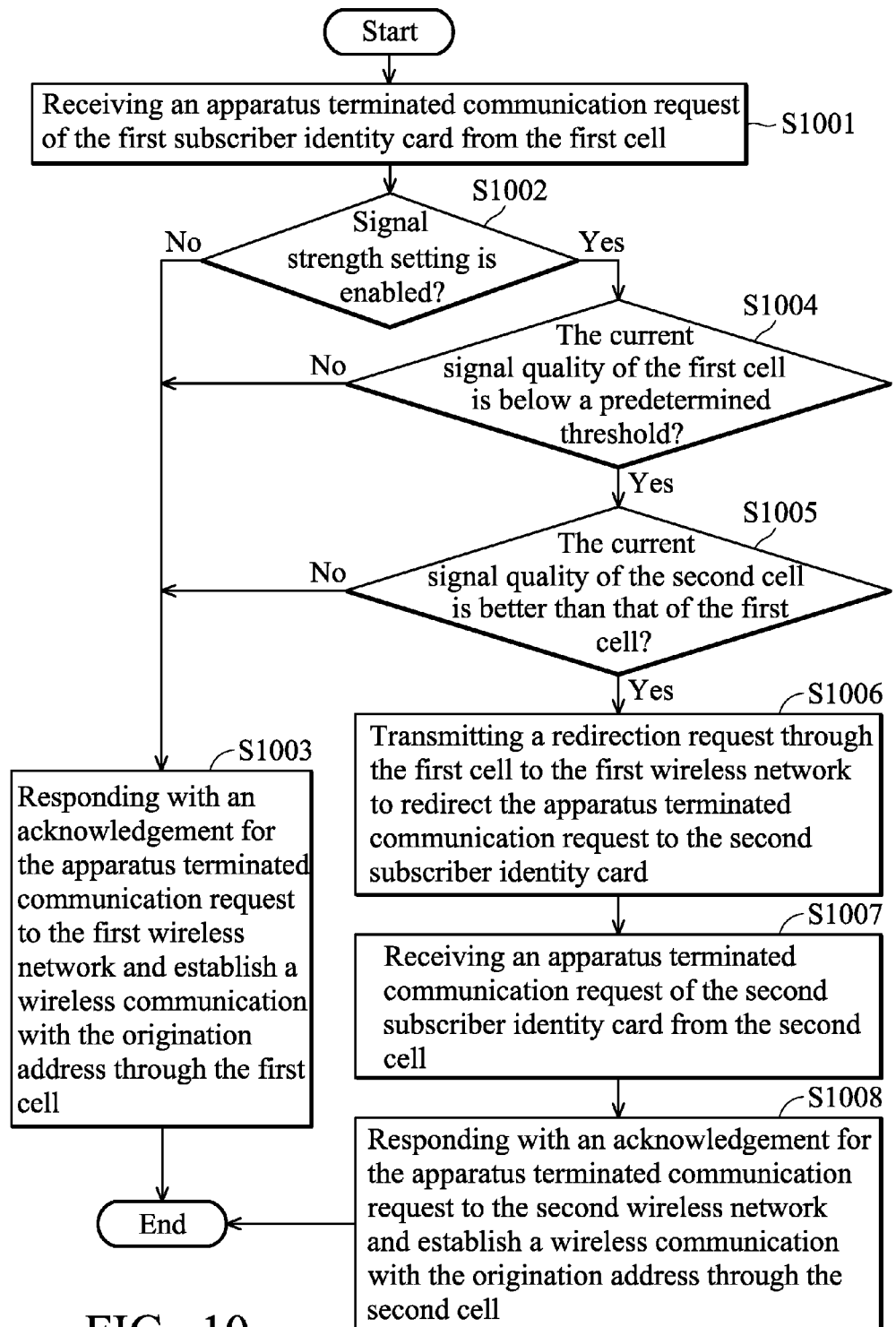
FIG. 10 shows a flow chart of the method for handling an apparatus terminated communication request in a communication apparatus equipped with more than one subscriber identity card according to the embodiment of the invention.

FIG. 10 shows a flow chart of the method for handling an apparatus terminated communication request in a communication apparatus equipped with more than one subscriber identity card according to the embodiment of the invention. When a peer user plans to originate a communication service to communicate with the user of the communication apparatus 100 via a first subscriber identity card (as an example, 101) plugged into the corresponding socket of the communication apparatus 100, the processor, such as 105, 105A, 105B or 105C, may receive an apparatus terminated communication request of the first subscriber identity card with an origination address indicating the address of the peer user from the corresponding cell that the first subscriber identity card camps on (hereinafter called the first cell for brevity), where the origination address may be a telephone number, a cellular phone number, an IP address, or the like (Step S1001). Next, the processor determines whether the signal strength setting is enabled (Step S1002). According to the embodiment of the invention, the signal strength setting for an apparatus terminated communication request may be the allowance approved by the user to automatically redirect the apparatus terminated communication request that was originally directed to one subscriber identity card to another subscriber identity card that is also plugged into the corresponding socket of the communication apparatus 100 and camps on a cell with better signal quality. When the signal strength setting is disabled, the processor may respond with an acknowledgement for the apparatus terminated communication request to the corresponding wireless network that the first cell belongs to (hereinafter called the first wireless network for brevity) and establish a wireless communication with the origination address through the first cell (Step S1003). Alternatively, when the signal strength setting is enabled, the processor may further determine whether the current signal quality of the first cell is below a predetermined threshold (Step S1004) by accessing the periodically updated signal qualities stored in the memory device as described above. When the current signal quality of the first cell is not below the predetermined threshold, the processor may respond with an acknowledgement for the apparatus terminated communication request to the first wireless network and establish a wireless communication with the origination address through the first cell (Step S1003). Alternatively, when the current signal quality of the first cell is below the predetermined threshold, the processor may further determine whether the current signal quality of the corresponding cell that a second subscriber identity card (as an example, 102) plugged into the corresponding socket of the communication apparatus 100 camps on (hereinafter called the second cell for brevity) is better than that of the first cell (Step S1005). When the current signal quality of the second cell is not better than that of the first cell, the processor may respond with an acknowledgement for the apparatus terminated communication request to the first wireless network and establish a wireless communication with the origination address through the first cell (Step S1003). Alternatively, when the current signal quality of the second cell is better than that of the first cell, the processor may transmit a redirection request through the first cell to the first wireless network to indicate that the user would like to redirect the apparatus terminated communication request to the second subscriber identity card (Step S1006). Next, the processor may further receive a release message from the first cell to release the apparatus terminated communication request of the first subscriber identity card, and receive an apparatus terminated communication request of the second subscriber identity card with the origination address from the second cell (Step S1007). Finally, the processor may respond with an acknowledgement for the apparatus terminated communication request to the second wireless network and establish a wireless communication with the origination address through the second cell (Step S1008).

Figure 11:
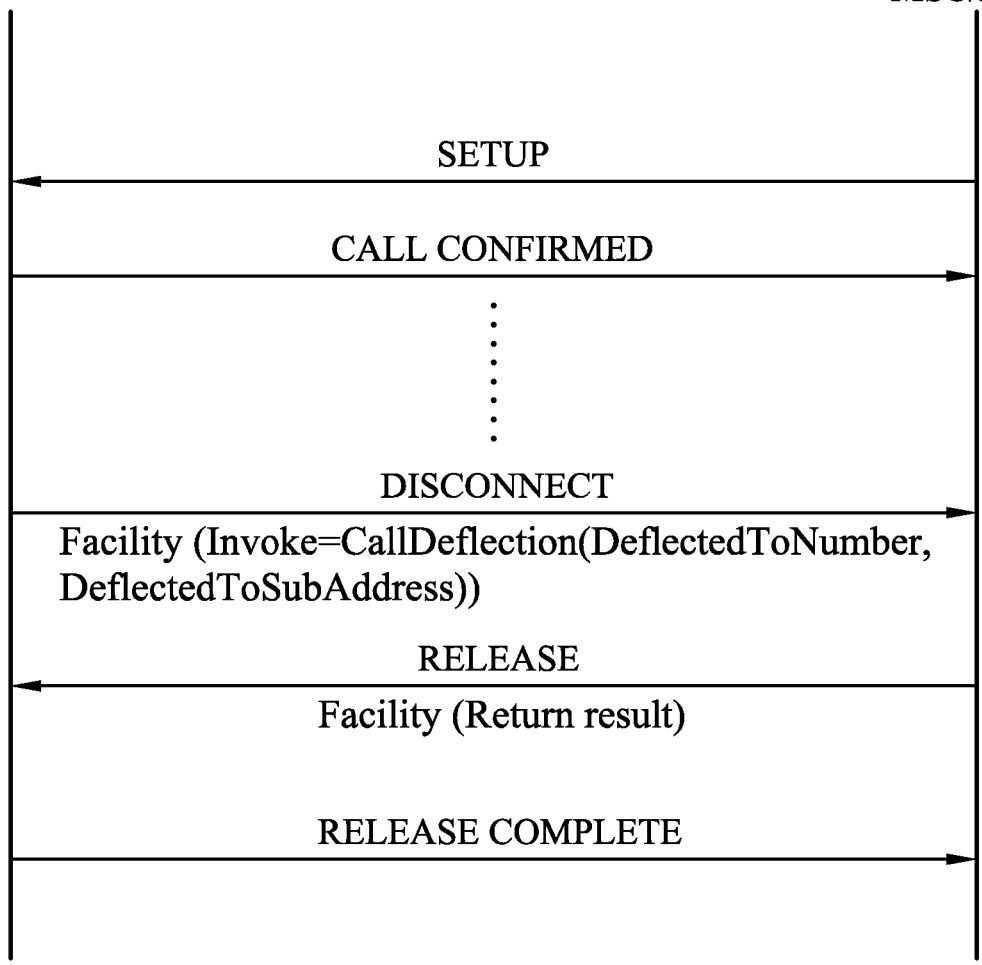
FIG. 11 shows a sequence diagram illustrating the message flow when implementing the call deflection supplementary service.

According to the embodiment of the invention, the redirection request may be a call deflection supplementary service (SS) request with a destination address set as the corresponding address of the second subscriber identity card or a call forwarding supplementary service request with the destination address set as the corresponding address of the second subscriber identity card. FIG. 11 shows a sequence diagram illustrating the message flow when implementing the call deflection supplementary service. The communication apparatus 100 may invoke the call deflection supplementary service by initiating call clearing with a DISCONNECT message including a call deflection request. The call deflection request contains the DeflectedToNumber which may be accompanied by a DeflectedToSubAddress. The communication apparatus 100 may invoke the call deflection supplementary service every time after call confirmation until the call is accepted. If the mobile switching center (MSC) accepts the call deflection request, the MSC continues call clearing. The result indication message is returned to the communication apparatus 100 in the RELEASE message.

Figure 12:
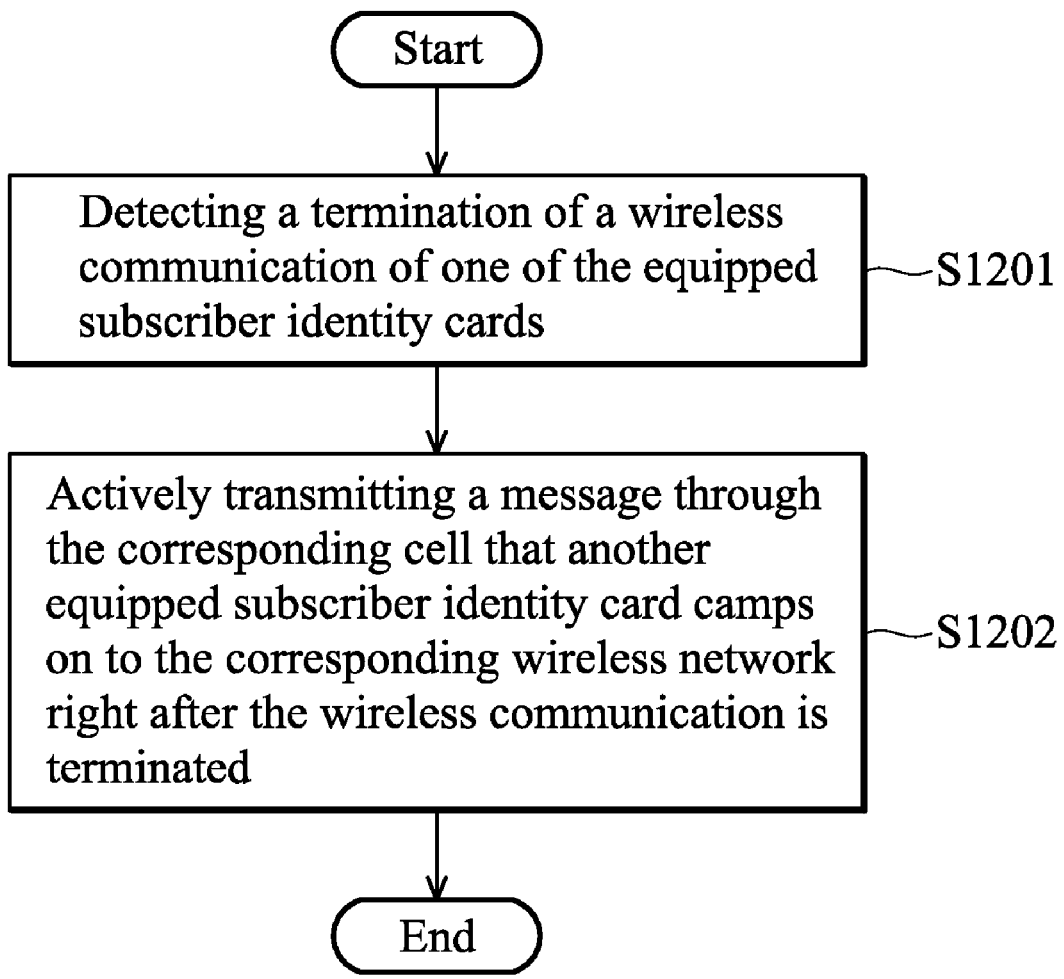
FIG. 12 shows a flow chart of the method for providing a more reliable communication service in the communication apparatus equipped with more than one subscriber identity card according to the embodiment of the invention.

According to a third embodiment of the invention, after the user of the communication apparatus 100A as shown in FIG. 1 has finished a wireless communication with a peer user of a peer communication apparatus via the radio transceiver module 104 by using a first subscriber identity card (as an example, 101) that is plugged into the corresponding socket of the communication apparatus 100A, which may be originated by the communication apparatus 100A or the peer communication apparatus, the processor, such as 105, may further transmit a message right away through the corresponding cell (hereinafter called the second cell) that the second subscriber identity card (as an example, 102) camps on, to actively communicate with the corresponding wireless network (hereinafter called the second wireless network). As an example, when the second wireless network is trying to inform the second subscriber identity card of a transmission of a short message, a multimedia message, an e-mail, or the like, during the time interval that the user of communication apparatus 100A is communicating with the peer user by using the first subscriber identity card, the second wireless network gets no response and considers that the communication apparatus 100A is unavailable. Since the single radio transceiver module 104 is now being occupied by the first subscriber identity card, the short message, multimedia message or e-mail can not be delivered to the second subscriber identity card, and the second wireless network may decide to retransmit the short message, multimedia message or e-mail later, for example, after twenty minutes or longer. Under such a circumstance, the processor is preferably directed to actively communicate with the second wireless network right after the wireless communication of the first subscriber identity card is terminated; as an example, within 4 seconds right after the wireless communication is terminated. By actively communicating with the second wireless network, the second wireless network may soon be aware that the second subscriber identity card has become reachable, and may quickly retransmit the buffered short messages, multimedia messages or e-mails to the second subscriber identity card. According to an embodiment of the invention, the message for actively communication with the second network may be a location update message providing current location information to the second wireless network, a supplementary service query message querying the setting statuses of the supplementary service of the second subscriber identity card, or an apparatus originated communication request originating a wireless communication with the second wireless network. The processor may transmit a location update message to provide current location information to the second wireless network. Or, the processor may further determine a location update period of the second subscriber identity card according to a location update period parameter obtained from system information carried in a BCCH burst through the second cell, and transmit a supplementary service query message to the second cell when the determined location update period is longer than a predetermined period. As an example, when the determined location update period is longer than one hour, the processor may transmit a supplementary service query message, such as a call forward supplementary service setting query for querying the setting status of the call forward supplementary service, to the second cell. FIG. 12 shows a flow chart of the method for providing a more reliable communication service in the communication apparatus equipped with more than one subscriber identity card according to the embodiment of the invention. The processor (such as 105) first detects a termination of a wireless communication of one equipped subscriber identity card (Step S1201). Next, the processor may actively transmit a message through the corresponding cell that another equipped subscriber identity card camps on to the corresponding wireless network via the radio transceiver module right after the wireless communication is terminated (Step S1202). By actively communicating with the corresponding wireless network of another equipped subscriber identity card, the wireless network may soon be aware that the subscriber identity card has become reachable, and may quickly retransmit the buffered short messages, multimedia messages or e-mails to the subscriber identity card.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communication apparatus having at least one radio transceiver module, a first subscriber identity card and a second subscriber identity card, wherein the first subscriber identity card camps on a first cell belonging to a first wireless network via the radio transceiver module, and the second subscriber identity card camps on a second cell belonging to a second wireless network via the same radio transceiver module as the first subscriber identity card camps on, or a different radio transceiver module, the communication apparatus comprising:
   processor logic coupled to the first subscriber identity card, the second subscriber identity card and the radio transceiver module(s), receiving an apparatus originated communication request with a destination address;
   processor logic comparing a signal strength of a first signal received from the first cell with a signal strength of a second signal received from the second cell; and
   processor logic establishing a wireless communication with a peer device having the destination address through the cell with better signal strength.

2. The communication apparatus as claimed in claim 1, wherein at least one of the first subscriber identity card and the second subscriber identity card is the subscriber identity module (SIM) card corresponding to a global system for mobile communications (GSM) communication system, a universal subscriber identity module (USIM) card corresponding to a universal mobile telecommunications system (UMTS) communication system, or a removable user identity module (RUIM) card or the CDMA subscriber identity module (CSIM) card corresponding to a code division multiple access (CDMA) 2000 communication system.

3. The communication apparatus as claimed in claim 1, wherein the signal strength of the first signal and the signal strength of the second signal are measured according to a power or a signal to noise ratio of a plurality of pilot signals carried in broadcast messages received from the first cell and the second cell, respectively.

4. The communication apparatus as claimed in claim 1, further comprising a memory device storing information indicating one of the first and second subscriber identity cards as a preferred subscriber identity card, wherein the processor establishes the wireless communication with the peer device having the destination address through the cell that the preferred subscriber identity card camps on when the signal strength of the first signal and the signal strength of the second signal are substantially the same.

5. The communication apparatus as claimed in claim 1, further comprising a memory device storing a signal strength setting, further comprising processor logic that further receives an indication message from an user for indicating a selection of either the first subscriber identity card or the second subscriber identity card, and establishes the wireless communication with the peer device having the destination address through the first cell or the second cell according to the indication message when the signal strength setting is disabled.

6. The communication apparatus as claimed in claim 1, further comprising a memory device storing a signal strength setting, further comprising processor logic that further determines whether the signal strength setting is enabled, and establishes the wireless communication with the peer device having the destination address through the cell with better signal strength when the signal strength setting is enabled.

7. A communication apparatus having at least one radio transceiver module, a first subscriber identity card and a second subscriber identity card, wherein the first subscriber identity card camps on a first cell belonging to a first wireless network via the radio transceiver module, and the second subscriber identity card camps on a second cell belonging to a second wireless network via the same radio transceiver module as the first subscriber identity card camps on, or a different radio transceiver module, the communication apparatus comprising:

processor logic coupled to the first subscriber identity card, the second subscriber identity card and the radio transceiver module(s), receiving an apparatus terminated communication request of the first subscriber identity card with an origination address from the first cell, processor logic comparing a signal strength of a first signal received from the first cell with a signal strength of a second signal received from the second cell; and processor logic transmitting a redirection request through the first cell to the first wireless network via the radio transceiver module to instruct the first wireless network to redirect the apparatus terminated communication request to the second subscriber identity card when the signal strength of the second signal is better than the signal strength of the first signal.

8. The communication apparatus as claimed in claim 7, wherein the redirection request is a call deflection request with the second address or a call forwarding request with the second address.

9. The communication apparatus as claimed in claim 7, wherein at least one of the first subscriber identity card and the second subscriber identity card is the subscriber identity module (SIM) card corresponding to a global system for mobile communications (GSM) communication system, the universal subscriber identity module (USIM) card corresponding to the universal mobile telecommunications system (UMTS) communication system, or the removable user identity module (RUIM) card or the CDMA subscriber identity module (CSIM) card corresponding to the code division multiple access (CDMA) 2000 communication system.

10. The communication apparatus as claimed in claim 7, wherein the signal strength of the first signal and the signal strength of the second signal are measured according to a power or a signal to noise ratio of a plurality of pilot signals carried in broadcast messages received from the first cell and the second cell, respectively.

11. The communication apparatus as claimed in claim 7, further comprising processor logic that further receives a release message from the first cell to release the apparatus terminated communication request of the first subscriber identity card, receives an apparatus terminated communication request of the second subscriber identity card with the origination address from the second cell and establishes a wireless communication with the origination address through the second cell.

12. The communication apparatus as claimed in claim 7, further comprising a memory device storing a signal strength setting, wherein the processor further establishes a wireless communication with the origination address through the first cell when the signal strength setting is disabled or when the signal strength of the second signal is not better than the signal strength of the first signal.

13. The communication apparatus as claimed in claim 7, further comprising a memory device storing a signal strength setting, further comprising processor logic that further determines whether the signal strength setting is enabled and transmits the redirection request through the first cell to the first wireless network via the radio transceiver module when the signal strength of the second signal is better than the signal strength of the first signal and the signal strength setting is enabled.

14. A communication apparatus having a single radio transceiver module, a first subscriber identity card and a second subscriber identity card, wherein the first subscriber identity card camping on a first cell belonging to a first wireless network via the radio transceiver module, and the second subscriber identity card camping on a second cell belonging to a second wireless network via the radio transceiver module, the improvement comprising:

a processor coupled to the first subscriber identity card, the second subscriber identity card and the radio transceiver module, transmitting a message through the second cell to the second wireless network via the radio transceiver module right after the first subscriber identity card has finished a wireless communication with a peer communication apparatus.

15. The communication apparatus as claimed in claim 14, wherein the message is a location update message providing current location information to the second wireless network.

16. The communication apparatus as claimed in claim 14, wherein the message is a supplementary service query message querying a status of a supplementary service for the second subscriber identity card.

17. The communication apparatus as claimed in claim 14, wherein the message is an apparatus originated communication request originating a wireless communication with the second wireless network.

18. The communication apparatus as claimed in claim 14, wherein the processor transmits the message to the second wireless network within 4 seconds right after the first subscriber identity card has finished the wireless communication with the peer communication apparatus.

19. The communication apparatus as claimed in claim 14, wherein the processor transmits the message to the second wireless network right after the first subscriber identity card has finished the wireless communication with the peer communication apparatus when the second wireless network is trying to inform the second subscriber identity card of a transmission of an incoming short message during the wireless communication of the first subscriber identity card.

20. The communication apparatus as claimed in claim 16, wherein the processor further determines a location update period of the second subscriber identity card according to a location update period parameter obtained from system information carried in a Broadcast Control Channel (BCCH) burst through the second cell, and transmits the supplementary service query message to the second wireless network when the location update period is determined to be longer than a predetermined period.

21. A method for handling mobile originated calls, comprising:

receiving, by a processor, receiving an apparatus originated communication request with a destination address;

comparing, by the processor, a signal strength of a first signal received from a first cell on which a first subscriber identity card camps with a signal strength of a second signal received from a second cell on which a second subscriber identity card camps; and establishing, by the processor, a wireless communication with a peer device having the destination address through one of the first and second cells with better signal strength.

22. The method as claimed in claim 21, wherein the signal strength of the first signal and the signal strength of the second signal are measured according to a power or a signal to noise ratio of a plurality of pilot signals carried in broadcast messages received from the first cell and the second cell, respectively.

23. The method as claimed in claim 21, further comprising:
reading, by the processor, information indicating one of the first and second subscriber identity cards as a preferred subscriber identity card from a memory device; and
establishing, by the processor, the wireless communication with the peer device having the destination address through the cell that the preferred subscriber identity card camps on when the signal strength of the first signal and the signal strength of the second signal are substantially the same.

24. The method as claimed in claim 21, further comprising:
reading, by the processor, a signal strength setting from a memory device; and
receiving, by the processor, an indication message from an user for indicating a selection of either the first subscriber identity card or the second subscriber identity card, and establishing the wireless communication with the peer device having the destination address through the first cell or the second cell according to the indication message when the signal strength setting is disabled.

25. The method as claimed in claim 21, further comprising:
reading, by the processor, a signal strength setting from a memory device; and
determining, by the processor, whether the signal strength setting is enabled, and establishes the wireless communication with the peer device having the destination address through the cell with better signal strength when the signal strength setting is enabled.

26. A method for handling mobile terminated calls, comprising:
receiving, by a processor, a apparatus terminated communication request to a first subscriber identity card with an origination address from a first cell;
comparing, by the processor, a signal strength of a first signal received from a first cell on which the first subscriber identity card camps with a signal strength of a second signal received from the second cell on which a second subscriber identity card camps; and
transmitting, by the processor, a redirection request through the first cell to the first wireless network via a radio transceiver module to instruct a first wireless network to redirect the apparatus terminated communication request to the second subscriber identity card when the signal strength of the second signal is better than the signal strength of the first signal.

27. The method as claimed in claim 26, wherein the redirection request is a call deflection request with the second address or a call forwarding request with the second address.

28. The method as claimed in claim 26, wherein the signal strength of the first signal and the signal strength of the second signal are measured according to a power or a signal to noise ratio of a plurality of pilot signals carried in broadcast messages received from the first cell and the second cell, respectively.

29. The method as claimed in claim 26, further comprising:
receiving, by the processor, a release message from the first cell to release the apparatus terminated communication request to the first subscriber identity card;
receiving, by the processor, an apparatus terminated communication request to the second subscriber identity card with the origination address from the second cell; and
establishing, by the processor, a wireless communication with the origination address through the second cell.

30. The method as claimed in claim 26, further comprising:
reading, by the processor, a signal strength setting from a memory device; and
establishing, by the processor, a wireless communication with the origination address through the first cell when the signal strength setting is disabled or when the signal strength of the second signal is not better than the signal strength of the first signal.

31. The method as claimed in claim 26, further comprising:
reading, by the processor, a signal strength setting from a memory device;
determining, by the processor, whether the signal strength setting is enabled; and
transmitting, by the processor, the redirection request through the first cell to the first wireless network via the radio transceiver module when the signal strength of the second signal is better than the signal strength of the first signal and the signal strength setting is enabled.

32. A method for handling calls, comprising:
camping on, by a processor, a first cell for a first subscriber identity card;
camping on, by the processor, a second cell for a second subscriber identity card; and
transmitting, by the processor, a message through the second cell to the second wireless network via a radio transceiver module right after the first subscriber identity card has finished a wireless communication with a peer communication apparatus.

33. The method as claimed in claim 32, wherein the message is a location update message providing current location information to the second wireless network.

34. The method as claimed in claim 32, wherein the message is a supplementary service query message querying a status of a supplementary service for the second subscriber identity card.

35. The method as claimed in claim 32, wherein the message is an apparatus originated communication request originating a wireless communication with the second wireless network.

36. The method as claimed in claim 32, wherein the transmitting step further comprises transmitting the message to the second wireless network within 4 seconds right after the first subscriber identity card has finished the wireless communication with the peer communication apparatus.

37. The method as claimed in claim 32, wherein the transmitting step further comprises transmitting the message to the second wireless network right after the first subscriber identity card has finished the wireless communication with the peer communication apparatus so as to obtain an incoming short message, which was informed by the second wireless network, during the wireless communication of the first subscriber identity card.

38. The method as claimed in claim 34, further comprising determining, by the processor, a location update period of the second subscriber identity card according to a location update period parameter obtained from system information carried in a Broadcast Control Channel (BCCH) burst through the second cell, wherein the transmitting step further comprises transmitting the supplementary service query message to the second wireless network when the location update period is determined to be longer than a predetermined period.

* * * * *